Jan. 26, 1965 A. F. BRIEDE 3,167,095
AUTOMATIC SHUT-OFF LOADING VALVE
Filed Feb. 2, 1961

INVENTOR.
ARTHUR F. BRIEDE,
BY Allen & Allen
ATTORNEYS.

United States Patent Office 3,167,095
Patented Jan. 26, 1965

3,167,095
AUTOMATIC SHUT-OFF LOADING VALVE
Arthur F. Briede, Cincinnati, Ohio, assignor to Dover Corporation, a corporation of Delaware
Filed Feb. 2, 1961, Ser. No. 86,789
7 Claims. (Cl. 137—630.15)

The invention relates to valved nozzle structures such as are used for filling fluids into tanks, in which structures the valve mechanism, after being opened by the operator, closes automatically in response to a sensing device, as for example, when the fluid in the tank reaches a predetermined level.

It is a principal object of the invention to provide an improved structure which is more positive in action and in which the means responsive to the impulse which is to close the valve is more sensitive.

It is an object of the invention to provide a structure having the above advantage and in which the closing of the valve is controllable as to speed, whereby to avoid shock in the apparatus, even when the valve is used for filling large quantities of liquids at high speeds and pressures.

It is an object of the invention to provide a structure in which all operating parts are housed and protected.

It is an object of the invention to provide a structure in which all of the above advantages are obtained by a simple and sturdy construction.

These and other objects of the invention which will be set forth hereinafter or will be apparent to one skilled in the art are attained by that construction and arrangement of parts of which an exemplary embodiment will now be described. Reference is made to the drawings forming part of this application, and wherein.

Figure 1:
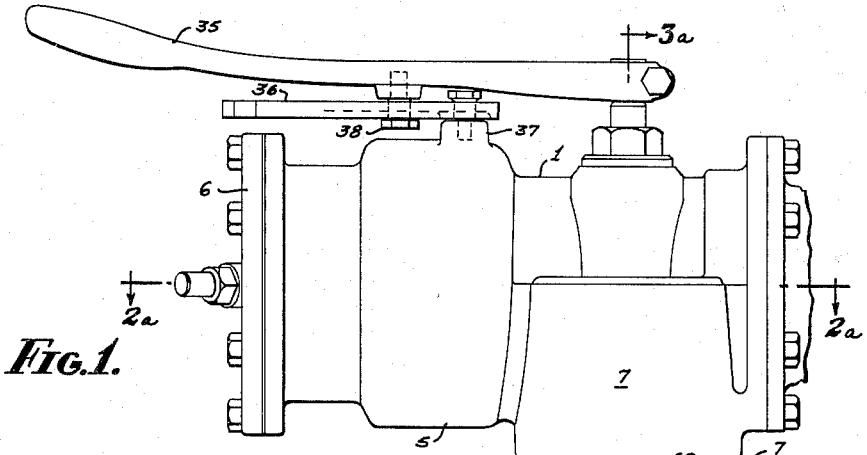
FIG. 1 is an elevational view of the nozzle with one corner portion broken away to show an interior construction.
Figure 2:
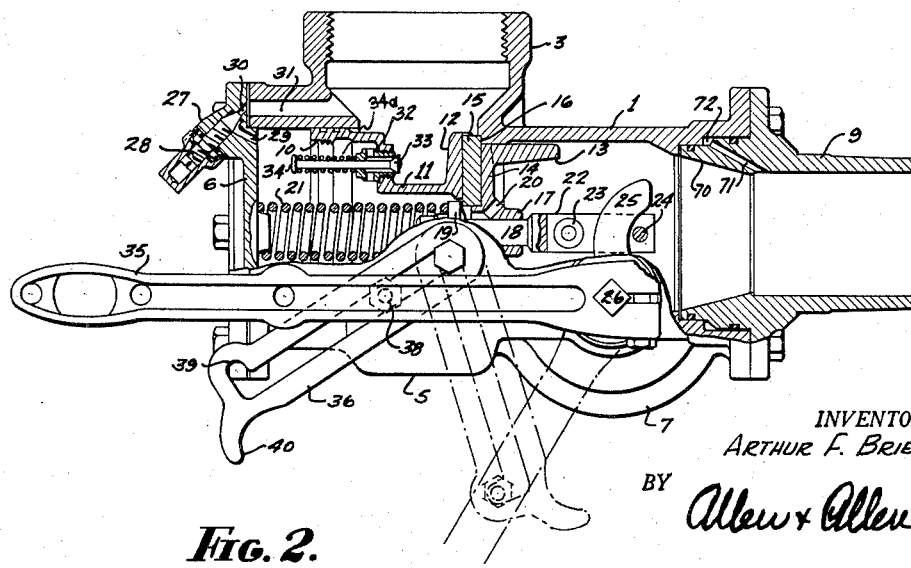
FIG. 2 is a partial longitudinal section of the nozzle taken along the section line 2a—2a of FIG. 1.

As will be evident from FIGS. 1 and 2, the nozzle comprises a hollow body 1 having at one side a fitting 3 which may be connected to a conduit for the entrance of fluid into the nozzle. The body is somewhat enlarged peripherally at the level of this fitting as shown at 5. The upper end of the body is flanged to accept a closure cap 6 which may be bolted or otherwise fastened in place. Near the lower end of the body there is formed a transversely extending chamber 7 which houses the means responsive to the sensing device as hereinafter explained. This chamber has an axial extension 8 open to the interior of the body 1. The lower end of the body is flanged or otherwise configured for the reception of a spout member 9. The spout itself may take various forms appropriate to the work to be performed by the nozzle.

The valve is in the form of a piston, having an upper portion 10 of cylindrical form sliding within an upper portion of the body 1 which is cylindrical in interior configuration. A sliding fit with close tolerances is provided here, or sealing rings may be used, since fluid is not intended to pass between the body and the valve portion 10. Below the portion 10, the valve body necks down at 11 and then enlarges again at 12. The lower portion of the valve has a circular portion 14 with projecting guides 13 giving a sliding fit in the body 1, the disc-like portion 14 lying opposite the portion 12. Between these last mentioned portions there is an annular block of resilient substance 15, the external edge portion of which is adapted to seat against a suitably configured portion 16 of the interior walls of the body at the base of the peripheral enlargement 5.

The disc-like portion of the valve is perforated centrally and provided with a boss 17 in which a valve rod 18 is slidably journaled. It will be seen in FIG. 2 that the upper end of the valve rod 18 carries a supplementary valve head 19 which seats against the inner edge of the resilient annular block 15. This provides an auxiliary valve for the relief of pressure prior to the opening of the main valve. There are passageways 20 in and adjacent the boss 17 so that fluid can get past the supplementary valve head 19 when it is raised from its seat. A strong spring 21 engages between the supplementary valve head 19 and the closure cap 6, being held against displacement by bosses on each.

The lower end of the valve rod 18 is enlarged and bifurcated as at 22, and has pins or rollers 23 and 24 in spaced relationship bridging across the bifurcations. The valve rod is moved upwardly by a curved finger 25 lying between the pins or rollers, which in turn is operated by a shaft 26. It will be evident that as the finger moves in a counter clockwise direction in FIG. 2, the upward movement of the valve rod 18 will bring the supplementary valve head away from the element 15. Thereafter the shoulder formed by the enlargement 22 on the rod 18 engages the boss 17, and the whole valve structure moves upwardly bringing element 15 away from the valve seat 16.

Assuming that the hollow interior of the main valve is filled with fluid under pressure, it will be seen that the initial operation of the supplementary valve head 19 acts as an unloading means for the main valve. Provision is made whereby fluid can get behind and within the main valve structure. In a hollow boss 27 on the closure cap 6 there is mounted an adjustable needle valve structure 28. A passageway 29 extends from the needle valve into the space behind the main valve; and another passageway 30 is so positioned as to connect with a passageway 31 formed in the upper wall portion of the nozzle body 1, leading from the needle valve to the entrance fitting 3. Thus fluid from the line side of the nozzle can enter the space behind the main valve at a rate determined by the adjustment of the needle valve.

The main valve also carries another valve comprising a fitting 32 forming a valve seat, and a valve member having a head 33 and an elongated stem 34. A spring 34a surrounds the stem and, engaging between the fitting 32 and an abutment on the end of the stem, urges the valve to the closed position.

During the final upper travel of the main valve, the stem 34 contacts the under surface of the closure cap 6, opening the valve 32, 33 so that the main valve may move upwardly without encountering substantial fluid resistance. In the operation of closing the main valve, the main valve can travel rapidly in the downward direction until the valve 32, 33 closes. Thereafter the speed of closure of the main valve will depend on the rate at which the needle valve 28 admits fluid to the space above the main valve. Since this rate is adjustable, the structure can be rendered free of shock and fluid hammer.

An elongated operating handle 35 is affixed to the shaft 26. A slotted link element 36 is pivoted to a boss 37 on the peripheral enlargement 5 of the nozzle body. A stud 38 on the handle is slidable in the slot of the link. Dotted lines in FIG. 2 show the open position of the handle and link; and it can be seen how the link serves to maintain the handle in the open position because the stud 38 enters a transverse portion 39 of the slot. However, a projection 40 on the link, for engagement by the fingers, makes it easy at any time for the operator to release the locking engagement and permit the handle 35 to return to valve-closed position.

Figures 3, 4:
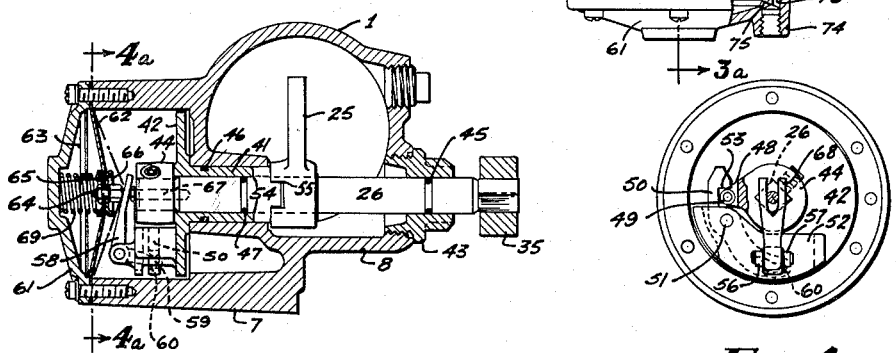
FIG. 3 is a partial sectional view taken along the section line 3a—3a of FIG. 1.
FIG. 4 is a partial sectional view taken along the section line 4a—4a of FIG. 3.

The sensing-responsive and release means is illustrated in FIGS. 3 and 4. A sleeve member 41 bearing a disc portion 42 is journaled in a partition dividing chamber 7 from the chamber extension 8. The main operating shaft 26 is journaled in a fitting 43 at one end. The other end of the shaft extends through the sleeve 41; and beyond the disc portion 42 it carries a member 44 which is non-rotatable with respect to the shaft and serves, among other things, to prevent withdrawal of the shaft in the right hand direction in FIG. 3. The use of a sealing ring 45 to prevent leakage of fluid from the body of the nozzle around the shaft will be noted. There are sealing rings 46 and 47 respectively on the shaft 26 and the sleeve 41 to prevent leakage of fluid from the interior of the nozzle through the partition aforesaid.

As shown in FIG. 4, the member 44 has a bifurcated extension 48 at one side, this extension carrying a roller 49. A latching lever 50 is pivoted at 51 on a bracket 52 mounted on the disc portion 42. The latch lever 50 has a notch 53 in which the roller 49 may engage, and it will be seen that so long as this engagement is maintained, the disc portion 42 and hence the sleeve 41 will rotate with the shaft 26. The operating finger 25, which has hereinabove been described, is mounted rotatably but in a fixed axial position on the shaft 26. There is an interengagement between the sleeve 41 and the operating finger 25. In FIG. 3, this interengagement is shown as comprising a tooth or detent 54 on the sleeve 41 and a corresponding notch 55 in the operating finger 25. This construction does not amount to a clutch, since the elements 54 and 55 never come out of engagement. It is simply a means facilitating the assembly of the structure, since it is not feasible to make the operating finger 25 integral with the sleeve member 41. So long as the latch mechanism hereinabove described remains in engagement, as shown in FIG. 4, the operating finger 25 will be moved by the shaft 26 under the influence of the handle 35, through the intermediary of the disc 42 and sleeve 41.

Pivoted on ears 56 and 57 on the bracket 52, there is a bell crank having an upper portion 58 overlying the member 44, and a downwardly depending portion 59 which is in the shape of a finger engaging in an opening 60 in the end of the latching lever 50. It will be evident from FIG. 3, that if the bell crank 58, 59 is rotated in the counter clockwise direction, it will so move the latching lever 50 as to release the engagement of the roller 49 in the notch 53.

The chamber 7 has a cover member 61. The cover member may be held to the body of the chamber 7 by screws or otherwise. A diaphragm 62 has its peripheral edge portion engaged between the cover member 61 and the walls of the chamber 7, as shown, and provides in the chamber a vacuum space indicated at 63. A rod member 64 passes through the center of the diaphragm and bears washers 65 and 66 on either side thereof. The right hand end of the rod 64, as shown in FIG. 3, may if desired be guided in a hole 67 extending axially of the shaft 26. The end of the upper portion of the bell crank element 58, 59 is bifurcated as at 68, and the bifurcation engages in a groove in the rod 64 as shown in FIG. 3. A relatively light spring 69 engages between the cover member 61 and the upper washer 65. Assuming that the interior of the chamber 7 below the diaphragm 62 is at atmospheric pressure, it will be evident that the formation of a vacuum in the space 63 above the diaphragm will move the rod 64 upwardly, and will consequently rock the bell crank 58, 59 in the counterclockwise direction.

As is usual in automatic shut-off valve structures means is provided tending to create a vacuum above the diaphragm 62, which vacuum is normally relieved or reduced to a value less than the effective strength of the spring 69 by a connection to the atmosphere. However, should resistance to the entrance of air through the aforesaid connection be encountered, more air will be exhausted from above the diaphragm 62 until the diaphragm will move against the operation of the spring 69.

The drawing of a vacuum in the space 63 may be accomplished in various ways. One way, which does not constitute a limitation on the invention, may be appreciated from FIG. 2. The spout element 9 has an interior conical configuration indicated at 70. This construction produces a venturi effect causing a vacuum to be drawn in one or more passageways 71 formed in the spout element 9 and communicating with an annular passageway 72. This is shown in FIG. 2.

In FIG. 1 it will be seen how a wall of the chamber 7 may be drilled as at 73 to provide a passageway connecting with the annular passageway 72. The diaphragm 62 is shown in FIG. 1 as perforated at the end of the passageway 73.

A nipple 74 may be formed on the cover member 61 the hollow interior of which has communication as at 75 with the space between the diaphragm 62 and the cover 61 and also as at 76 with the passageway 73. Those skilled in the art will understand that a flexible tube (not shown) may be connected by a suitable fitting to the nipple 74 and also to a sensing device located on or as part of a tank to be filled. So long as the flexible tube is open to the atmosphere the vacuum between the diaphragm 62 and the cover member 61 will be alleviated, but should an obstruction or resistance to the entrance of air occur in connection with the flexible tube, the vacuum in the space aforesaid will be increased. Such an obstruction will occur when the level of the fuel in the tank reaches the open end of the sensing device. While mention has been made of a sensing device separate from the nozzle, it will be understood that the nozzle spout may have such a sensing device built into it after the manner taught in the Duerr Patent 2,582,195.

Upon an increase in the vacuum in the space between the diaphragm 62 and the cover member 61, the force of the light spring 69 will be overcome and the diaphragm will be drawn toward the cover member. The bell crank 58 will be rocked in the counter clockwise direction in FIG. 3, and the latch 50 will be rocked in the counter clockwise direction in FIG. 4, releasing the latching engagement which has been described, and freeing element 44 from engagement with the disc 42 of the sleeve 41. The force of the spring 21 will move the main valve downwardly to the position shown in FIG. 2, closing also the supplementary valve 19. This action occurs because the finger 25 is now free to rotate on the shaft 26. The descent of the main valve can occur rapidly so long as the valve stem 34 remains depressed by the cover member 6. Thereafter the descent of the main valve to closed position will be at a rate determined by the needle valve 28.

It will be seen that the main valve of the device can close in response to the sensing means even though the operating handle 35 is being held in the open position by means of the link 36. When, however, the lock effected by this link is manually released and the operating lever 35 returned to unactuated position, the rotation of the element 44 on the end of the shaft 26 will displace the latch lever 50 sufficiently to re-establish the latch relationship shown in FIG. 4. A second actuation of the operating handle will therefore be effective in opening the main valve.

Modifications may be made in the invention without departing from the spirit of it. The invention having been described in an exemplary embodiment what is claimed as new and desired to be secured by Letters Patent is:

1. In an automatic valve mechanism, a hollow body having entrance and exit portions for fluid, and a cover upon one end, a main valve in the form of a hollow piston slidable within said body and having a seat beyond said entrance portion, a supplementary valve having a head and stem located centrally of said main valve, a spring engaged between the head of said supplementary valve and said cover and means for operating said main and supplementary valves comprising a shaft, a finger rotatably mounted on said shaft, means for connecting said finger to said shaft whereby said finger will rotate with the said shaft, said finger having a lost motion connection with the stem of said supplementary valve, said stem having a shoulder, the parts being so arranged that rotation of said finger by said shaft will first open said supplementary valve and thereafter bring said shoulder against said main valve to move said main valve away from its seat, means for disconnecting said finger from said shaft, whereby to permit rotation of said finger on said shaft so that said main valve may close under the influence of said spring, irrespective of the rotative position of said shaft.

2. The structure claimed in claim 1 including a passageway having an adjustable needle valve connecting the hollow interior of said main valve with the entrance portion of said body whereby to control the rate of closing of said main valve.

3. The structure claimed in claim 2 including a third valve formed in the body of said main valve, said third valve having an elongated stem adapted to contact the said cover and open said third valve when said main valve is away from its seat whereby the main valve is permitted to close rapidly until said third valve closes after which said main valve closes at slow rate thereby preventing line shock.

4. The structure claimed in claim 3 including means responsive to a sensing device for effecting automatic closure of said main and supplementary valves, said structure comprising an operating shaft on which said operating finger is rotatably mounted, said operating shaft having an operating handle, means for locking said handle in the valve-open position, a connection between said shaft and said finger including a latch and means responsive to a sensing means for releasing said latch whereby to permit rotation of said finger on said shaft to permit closure of said main valve under the influence of said spring.

5. The structure claimed in claim 3 including means responsive to a sensing device for effecting automatic closure of said main and supplementary valves, said body having a chamber formed thereon and divided from the hollow interior of said body by a partition, a sleeve journaled in said partition, a shaft journaled at one end in said body and at the other end in said sleeve, said operating finger being rotatably mounted on said shaft and non-rotatably connected with said sleeve, a member non-rotatably mounted on the end of said shaft within said chamber, a releasable latching connection between said last mentioned member and said sleeve, and diaphragm means in said chamber responsive to a sensing device for releasing said latching means whereby to permit said spring to close said main valve.

6. In an automatic valve dispensing nozzle a hollow body containing a valve, a shaft passing through said body and bearing an operating finger for actuating said valve, said finger being rotatably mounted on said shaft, latching means for causing said finger to rotate with said shaft whereby rotation of said shaft will act to open said valve, and means responsive to a sensing device acting on said latching means to release said finger with respect to said shaft to permit the rotation of said finger to close said valve irrespective of movement of said shaft.

7. The structure claimed in claim 6 wherein a chamber is formed on said hollow body and divided therefrom by a partition, wherein a sleeve is journaled in said partition, there being a non-rotatable connection between said sleeve and said finger, said sleeve bearing a disc within said chamber, a member within said chamber non-rotatably affixed to said shaft, a latching lever on said disc engageable with said non-rotatable member, a release lever on said disc acting when moved in one direction to release the latching engagement between said latching lever and said non-rotatable element, a diaphragm in said chamber connected with said last mentioned lever, a cap on said chamber spaced from said diaphragm, means in connection with said body for drawing a vacuum between said diaphragm and said cap member, and means for relieving the vacuum in said space excepting when the action of said last mentioned means is interrupted by a sensing means.

References Cited by the Examiner

UNITED STATES PATENTS

| 654,771 | 7/00 | Van Vechten | 251—38 |
| 2,319,069 | 5/43 | Krone | 251—38 |
| 2,528,747 | 11/50 | Gravelle | 251—114 XR |
| 2,661,136 | 12/53 | Huisman | 251—73 XR |
| 2,729,419 | 1/56 | Briede | 251—38 XR |
| 2,753,889 | 7/56 | Carr | 137—630.15 |
| 2,966,167 | 12/60 | Jensen | 137—630.19 XR |

FOREIGN PATENTS 1,119,712  6/56  France.

WILLIAM F. O'DEA, *Primary Examiner.*